United States Patent [19]
Indei

[11] Patent Number: 5,131,077
[45] Date of Patent: Jul. 14, 1992

[54] BACKUP SYSTEM FOR PRINTER CONTROL DEVICE

[75] Inventor: Shigeo Indei, Kanagawa, Japan

[73] Assignee: Fuji Xerox Co., Ltd., Tokyo, Japan

[21] Appl. No.: 804,537

[22] Filed: Dec. 11, 1991

Related U.S. Application Data

[63] Continuation of Ser. No. 595,848, Oct. 10, 1990, abandoned.

[51] Int. Cl.⁵ .............................................. G06K 15/00
[52] U.S. Cl. .................................... 395/113; 395/115; 395/114
[58] Field of Search .............. 395/115, 101, 113, 112, 395/114; 380/49-51, 3-5; 346/154; 400/74, 70, 76

[56] References Cited

U.S. PATENT DOCUMENTS

| | | | |
|---|---|---|---|
| 4,754,428 | 6/1988 | Schultz et al. | 364/900 |
| 4,837,737 | 6/1989 | Watanabe | 364/900 |

Primary Examiner—Arthur G. Evans
Attorney, Agent, or Firm—Finnegan, Henderson, Farabow, Garrett and Dunner

[57] ABSTRACT

In a backup system for a printer control device, the important data in the printer control device is formed into a file of important data, and the file of important data thus formed is backed up by a memory such as a file server, a mail server or a floppy disk, so that, when the important data is erased from the printer control device, the file of important data is read from the memory and stored in the printer control device, whereby the important data can be restored quickly and accurately, and the leakage of confidential data can be positively prevented.

15 Claims, 4 Drawing Sheets

BACKUP SYSTEM FOR PRINTER CONTROL DEVICE

This application is a continuation of application Ser. No. 07/595,848, filed Oct. 10, 1990, now abandoned.

BACKGROUND OF THE INVENTION

1. Field of the Invention

This invention relates to a backup system for a printer control device, and more particularly to a backup system for important data handled by a printer control device.

2. Discussion of the Related Art

In general, a printer control device handles important data such as billing data for charges for the use of the printer, the user's profile data, and confidential data. The loss of such important data for some reason would cause significant problems and inconvenience. Hence, a backup system is provided for the important data.

Typically, in a conventional backup system, a printing operation is carried out periodically so that the most recently handled important data is printed out as a hard copy. However, the above-described conventional backup system suffers from the following difficulties:

(1) If the important data is erased from the printer control device for some reason, then the operator must manually reenter the important data by referring to the hard copy. If the important data erased is a large file, then the reentry of the important data results in a loss of significant time and it becomes difficult to rely on the accuracy of the reentered data. If the reentered data includes errors, then the system is no longer useful.

(2) When the important data is printed out as a hard copy for backup, it is more likely that a third party will be able to gain access to what may be confidential data.

SUMMARY OF THE INVENTION

Accordingly, an object of this invention is to eliminate the above-described difficulties accompanying a conventional backup system for a printer control device.

More specifically, an object of the invention is to provide a backup system for a printer control device in which, when important data is erased from the printer control device, it can be quickly restored with ease and with high accuracy.

Another object of the invention is to provide a backup system for a printer control device which can positively prevent access to confidential data.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

The foregoing objects and other objects of the invention have been achieved by the provision of a backup system for a printer control device in which important data stored in the printer control device can be restored, which, according to the invention, comprises means for receiving an updated file of important data, a file holding section for holding the file of important data, a file server setting section for specifying a file transmission destination to which the updated file of important data in the file holding section is to be transmitted, and a file read and write control section for establishing a filing protocol with a file server specified by the file server setting section to transfer the updated file of important data to the file server, the updated file of important data being read from the file server and restored in the file holding section.

With the backup system, the important data in the printer control data is backed up by a file server, and when necessary, the important data is read from the file server and restored in the printer control device. Thus, the important data can be quickly and accurately restored in the printer control device.

In the backup system, instead of the file server, a mail server or external memory unit may be employed.

BRIEF DESCRIPTION OF THE DRAWINGS

The nature, principle and utility of the invention will become more apparent from the following detailed description when read in conjunction with the accompanying drawings.

In the accompanying drawings.

DETAILED DESCRIPTION OF THE INVENTION

This invention will be described with reference to the accompanying drawings.

Figure 2:
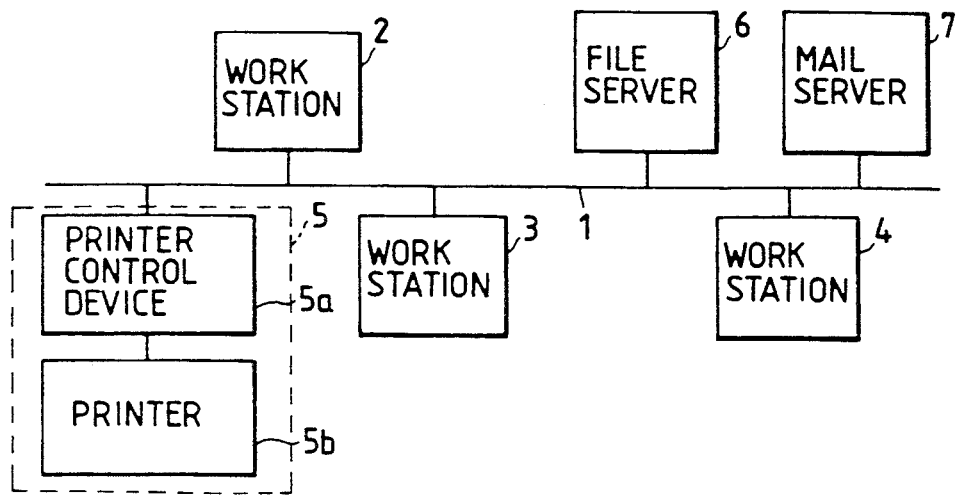
FIG. 2 is a block diagram outlining the arrangement of a communication network to which the technical concept of the invention is applied.

First, a communication network will be described with reference to FIG. 2, to which the technical concept of the invention is applied. As shown in FIG. 2, a network 1 is connected to a plurality of work stations 2, 3 and 4, a print server 5, a file server 6, and a mail server 7. The printer server 5 comprises a printer control device 5a and a printer 5b.

In general, the network is connected a plurality of print servers, a plurality of file servers, and a plurality of mail servers. However, for simplification, only one print server, one file server and one mail server are shown in FIG. 2.

Data prepared at the work stations 2 through 4 is transferred through the network 1 to the print server 5, where it is printed out as a hard copy.

Figure 3:
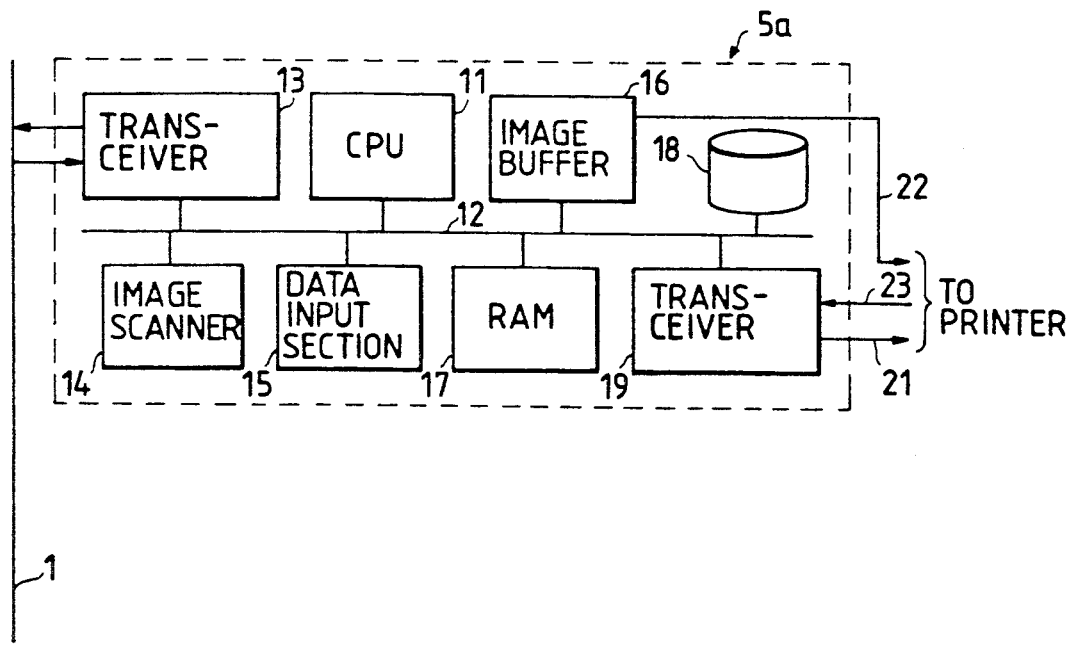
FIG. 3 is a block diagram outlining the arrangement of a printer control device shown in FIG. 2.

FIG. 3 is a block diagram outlining the arrangement of the printer control device 5a in the print server 5.

The printer control device 5a includes a CPU 11 for performing a variety of controls. The CPU 11 is connected to a data bus 12, which is connected to a transceiver 13 on the network side, an image scanner 14, a data input section 15, an image buffer 16, a RAM 17, a magnetic disk 18, and a transceiver 19 on the printer side.

The transceiver 13 on the network side incorporates a filing protocol and a mailing protocol for communication with the file server or mail server connected to the network 1. The transceiver 13 is adapted to receive a variety of data, such as control data and print data for the printer 5b, which is supplied through the network 1 from the work stations 2, 3 and 4.

Commands provided by the printer control device 5a are applied through a command line 21 to the printer 5b. The image buffer 16 supplies an image signal to the printer 5b through an image line 22. The status data of the printer 5b is applied to the printer control device 5a through a status line 23.

When a print request is made, the printer control device 5a receives it through the transceiver 13, and stores print data in the RAM 17. The CPU 11 converts the print data into an image signal by using the conversion data stored in the magnetic disk 18, and stores the image signal in the image buffer 16. Also, the CPU 11 detects the status of the printer 5b from the status data received through the transceiver 19 on the printer side. When it is detected that the printer 5b is ready for printing, the CPU 11 operates to supply the image signal from the image buffer 16 to the printer 5b through the image line 22.

The use of printer control device 5a organized in this manner insures that important data such as billing data for charges for the use of the printer, user profile data, and confidential data may be reliably handled.

Figure 4:
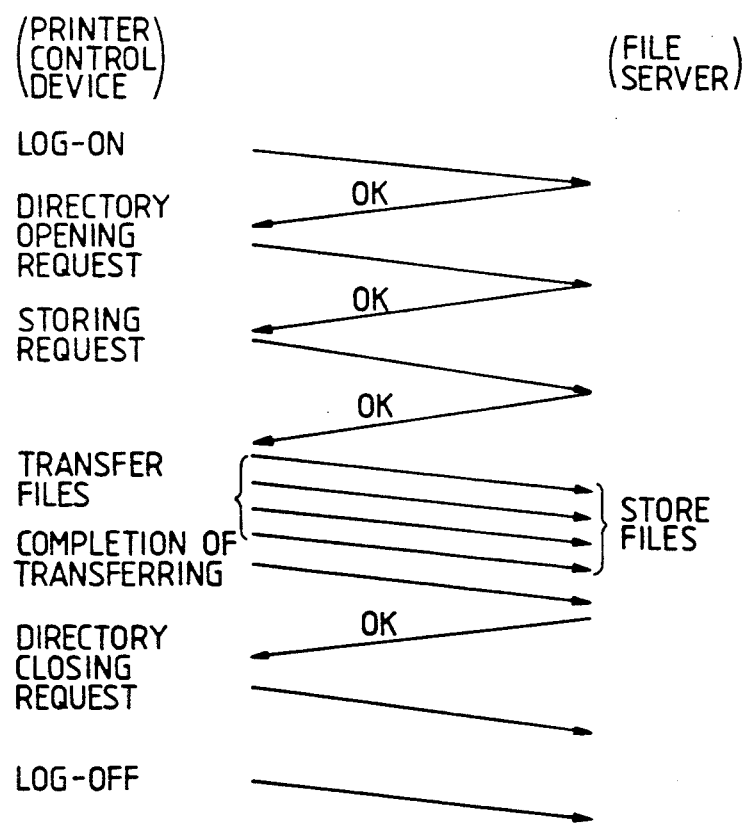
FIGS. 4 and 5 are explanatory diagrams showing filing protocols employed in the backup system.

One embodiment of the invention, a backup system for a printer control device which backs up such important data will be described with reference to FIGS. 1 and 4.

Figure 1:
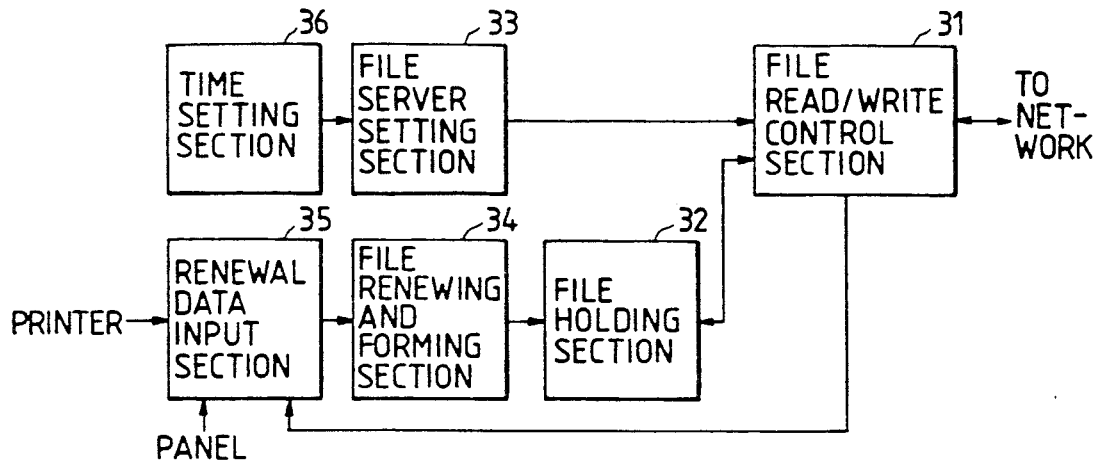
FIG. 1 is a block diagram showing the arrangement of a backup system for a printer control device in accordance with a first embodiment of this invention.

FIG. 1 is a block diagram showing how a novel backup function is given to the printer control device 5a according to the invention.

The backup system shown in FIG. 1 includes a file read and write control section 31, which corresponds to the above-described transceiver 13 on the network side (FIG. 3), a file holding section 32, which corresponds to the above-described RAM 17 or a memory region in the magnetic disk 18, and a file server setting section 33.

The file server setting section 33 operates to specify a destination where a file is to be stored. In the embodiment, when a time setting section 36 provides an output signal at a predetermined instant in time, the file server setting section 33 specifies a file server. Then, the file read and write control section 31 starts a filing protocol (as later described with reference to FIG. 4). It is preferable that the time setting section 36 activates the file server setting section 33 periodically, for instance, once a day.

Further in FIG. 1, a file renewing and forming section 34, operates to renew or form a file in response to renewal data from a renewal data input section 35. A renewed or newly formed file is stored in the file holding section 32; in other words, the most recently updated important data is stored in the file holding section 32.

The renewal data input section 35 receives data from the console panel and the printer in the printer control section through the network. More specifically, the renewal data input section receives data, for instance, on the user's profile from the console panel, and data, for instance, representing the amount of time the printer has been used.

Now, the operation of the embodiment of the invention will be described with reference to FIG. 4, which illustrates a filing protocol.

Upon reception of the file server specifying signal from the file server setting section 33, the file read and write control section 31 applies a log-on instruction to the specified file server specified. In response to an acknowledgment from the file server, the file read and write control section 31 makes a directory opening request. When an acknowledgment made for the request by the file server is received by the file read and write control section 31, the file read and write control section 31 issues a file storing request, and reads files out of the file holding section 32 and transfers them to the file server.

The file server stores the files thus received in the directory which has been opened in response to the directory opening request.

Upon completion of the transfer of the files, the file read and write control section 31 outputs a signal representing the end of data transfer. Thereafter, when the file server makes a reply to the file read and write control section 31 that all the files have been received accurately, the file read and write control section 31 issues a directory closing request to the file server, and then outputs a log-off instruction.

Thus, the most recently updated important data stored in the file holding section 32 is additionally stored in the file server connected to the network; that is, the most recently updated important data has been backed up.

Figure 5:
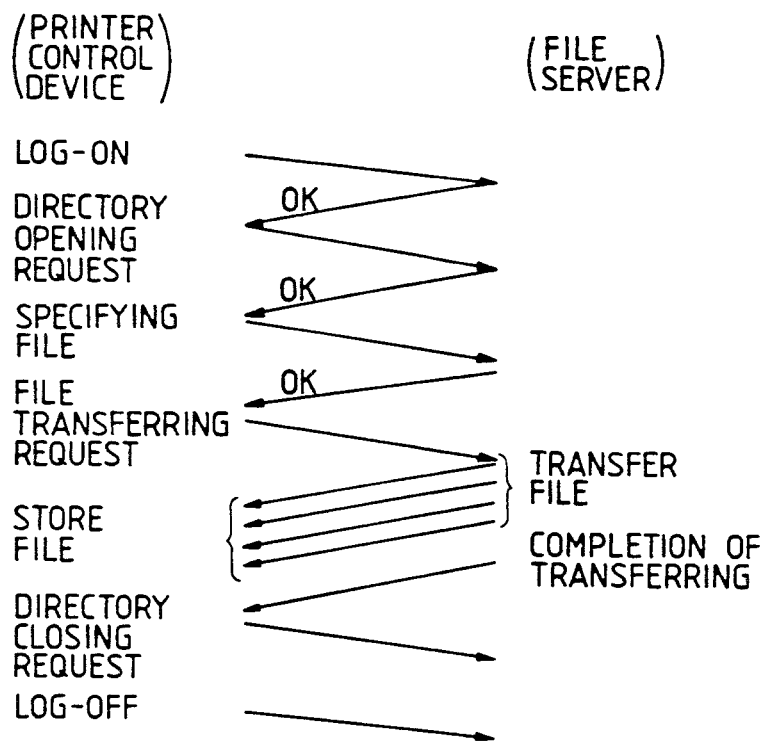

Now, the operation of reading the important data from the file server and reentering it in the printer control device will be described with reference to FIG. 5, which illustrates the protocol to be used.

First, the file read and write control section 31 applies a log-on instruction to the file server. In response to an acknowledgment from the file server, the control section 31 applies a directory opening request, and specifies a particular file. In response to an acknowledgment from the file server, the control section 31 makes a file transferring request.

In response to the file transferring request, the file server starts transferring the file. The file thus transferred is received by the control section 31, and stored in a predetermined area in the file holding section.

Upon completion of the transfer of the file, the file server outputs a signal representing the completion of the transfer of the file. Reception of the signal representing the completion of the transfer of the file causes the control section 31 to detect whether or not the file has been received correctly. When it is determined that the file has been received correctly, the control section 31 issues a directory closing request and outputs a log-off instruction. At the end of such processing, the file of important data has been restored in the file holding section 32 of the printer control device.

As is apparent from the above description, even if the important data is erased from the file holding section 32 for some reason, it can be read from the file server and stored in the file holding section 32 again. In this case, the important data is restored quickly, readily and accurately.

A second embodiment of the invention will be described with reference to FIGS. 6 and 7.

Figure 6:
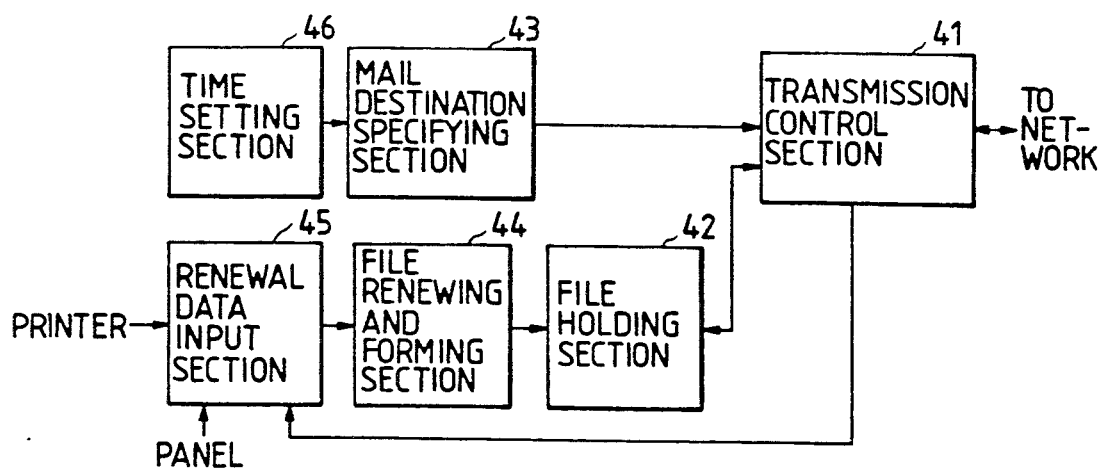
FIG. 6 is a block diagram showing the arrangement of a backup, system for a printer control device in accordance with a second embodiment of the invention.
Figure 7:
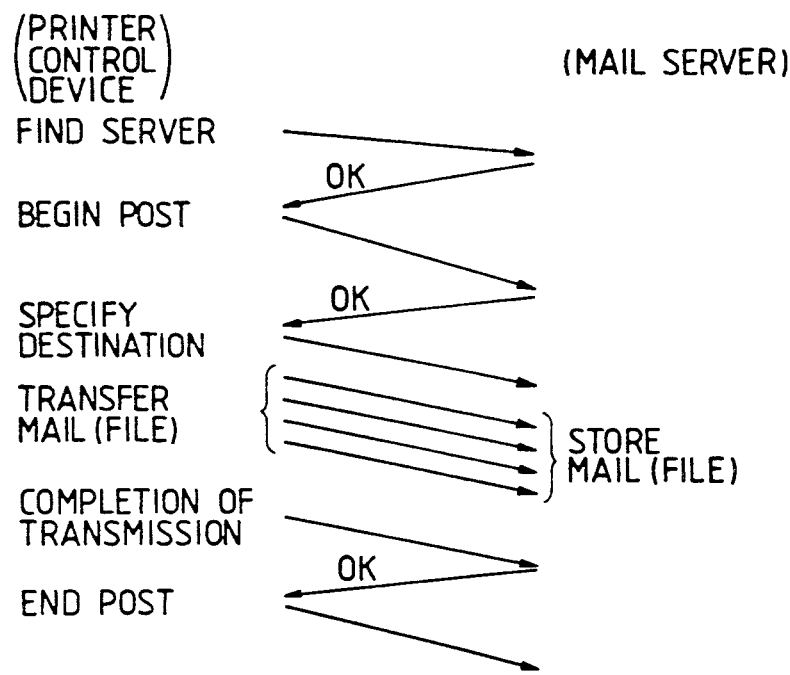
FIG. 7 is an explanatory diagram showing a mailing protocol employed in the backup system shown in FIG. 6.

FIG. 6 is a block diagram showing how novel functions are given to the printer control device 5a according to the invention.

The backup system shown in FIG. 6 includes a mail transmission control section 41 corresponding the above-described transceiver 13 (FIG. 3), and a mail transmission destination setting section 43 for specifying a file transmission destination to which a file is to be transmitted. In the embodiment, when a time setting section 46 outputs a signal at a predetermined instant in time, the mail transmission destination specifying section 43 provides an output signal specifying a file transmission destination, thus specifying a mail server. In response to the output signal of the mail transmission destination specifying section 43, the mail transmission control section 41 starts a mailing protocol (as later described with reference to FIG. 7).

Further in FIG. 6, reference numerals 42, 44, 45 and 46 designate the same or equivalent structure and functions as described for its file holding section 32, the file renewing and forming section 34, the renewal data input section 35, and the time setting section 36 shown in FIG. 1, respectively.

The operation of the second embodiment will be described with reference to FIG. 7.

Upon reception of the output signal of the mail transmission destination specifying section 43 specifying a mail transmission destination, the main transmission destination control section 41 transmits a "find server" instruction. When an acknowledgment to the instruction is made by a mail server, the control section 41 issues a "begin post" instruction to the mail server. In response to an acknowledgment to the instruction, the control section 41 performs a transmission destination specifying operation, and starts transmission of a mail (file) read out of the file holding section 42. The mail server stores the received mail in the post.

Upon completion of the transmission of the mail, the mail transmission destination control section 41 outputs a signal representing the end of data transfer. When it is determined that the mail has been received correctly, the mail server sends an acknowledgment to the control section 41. In response to an acknowledgment, the control section 41 issues an "end post" instruction to the mail server.

In the second embodiment, the file of important data is transferred to a mail server so that it is held as backup data. If the important data is erased from the file holding section 32 of the printer control device, and it is required to restore the important data, the important data can be restored by transferring the file from the mail server according to the mailing protocol.

As was described above, the important data inadvertently erased can be restored by transferring the file of important data from the mail server. Thus, the second embodiment of the invention has the same effect as the first embodiment.

One modification of the second embodiment will now be described. The specific feature of the modification resides in that, in FIG. 6, instead of the mail transmission destination setting section 43, a mail receiver setting section is employed so that the file of important data is transmitted to a predetermined receiver such as the authorized person. In this modification, the authorized person can restore the file of important data by reading it from the mail server. Therefore, the important data can be restored quickly, readily and accurately. Furthermore, a third party could not receive the file of important data which is important to prevent access to confidential data.

Now, a third embodiment of the invention will be described with reference to FIG. 8. The third embodiment is so designed that important data in the printer control device is transmitted to an external memory unit such as a floppy disk. When it is necessary to restore the important data in the printer control device, the important data is read from the external memory unit and restored in the printer control device.

Figure 8:
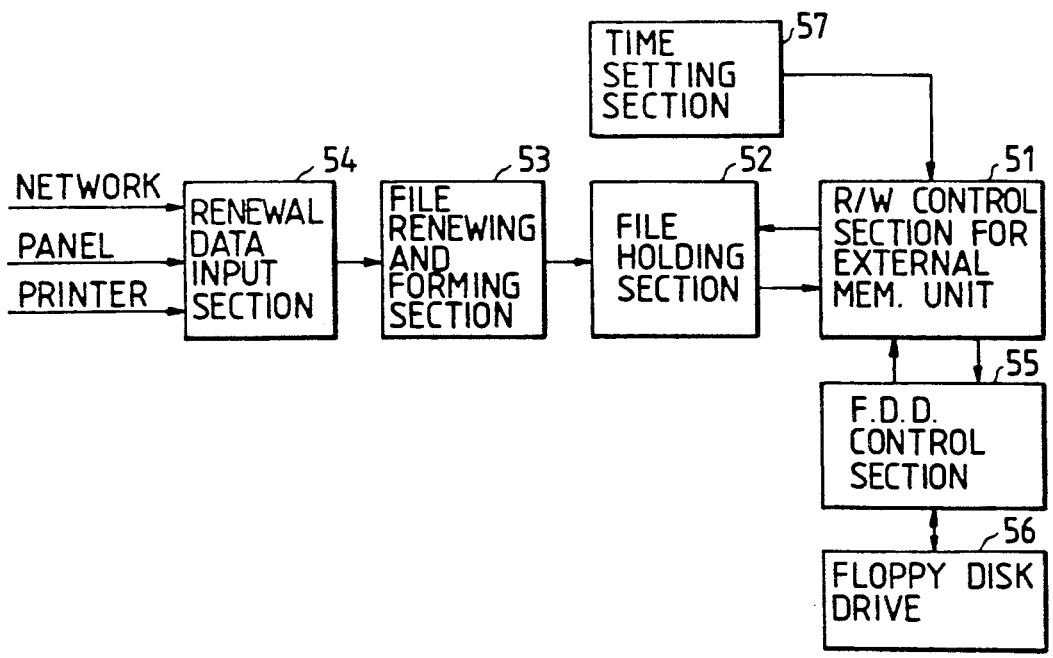
FIG. 8 is a block diagram showing the arrangement of a backup system for a printer control device in accordance with a third embodiment of the invention.

The backup system as shown in FIG. 8 includes a file read and write control section 51 for an external memory unit. When a time setting section 57 outputs a signal representing a predetermined instant in time, the file read and write control section 51 reads the file of important data from a file holding section 52 and supplies it to a floppy disk drive control section 55. The latter 55 writes the file of important data thus supplied in a predetermined address in the floppy disk 56.

Further in FIG. 8, the elements designated by reference numerals 52, 53 and 54 are the same as or equivalent to the file holding section 32, the file renewing and forming section 34, and the renewal data input section 35 shown in FIG. 1, respectively.

The operation of the third embodiment will now be described.

Upon reception of the signal representing the predetermined instant in time from the time setting section 57, the file read and write control section 51 reads the most recently updated data from the file holding section 51 and transmits it to the floppy disk drive control section 55, and issues a write instruction. Upon reception of the data, the floppy disk drive control section 55 drives the floppy disk to store the data in a predetermined address therein.

Thus, the important data stored in the printer control device has been stored in the floppy disk, effectively backing up the data.

When it is necessary to restore the important data in the file holding section of the printer control device, the file read and write control section 51 enables the floppy disk drive control section to read the data from the floppy disk 56. The data thus read is transmitted to the file holding section 52 and is restored quickly and accurately.

In the above-described embodiments, at a predetermined instant in time, or periodically, important data is transferred to the file server, the mail server, or the floppy disk, however, the invention is not limited thereto. That is, the operator may make an instruction to transfer the data at any desired instant in time.

As is apparent from the above description, the important data in the printer control device is backed up by transferring it to the file server, mail server or floppy disk instead of printing it out as a hard copy. Therefore, the important data can be quickly restored in the printer control device when erased.

Thus, the backup system according to the invention is very reliable.

Furthermore, when the important data is transmitted to the mail server with an authorized person as a receiver, inadvertent access to confidential data can be substantially prevented.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A printer control device for a communication network including a plurality of file servers, wherein important data stored in said printer control device can be restored, the printer control device comprising:
    means for receiving an updated file of important data to be printed by a printer which is controlled by the printer control device;
    file holding means for holding said updated file of important data;
    file server setting means for specifying one of said plurality of file servers to which said updated file of important data in said file holding means is to be transmitted prior to printing; and
    file read and write control means for establishing a filing protocol with the file server specified by said file server setting means to transfer said updated file of important data from said file holding mans to said file server, and when requested, to read said updated file of important data from said file server and restore said updated file of important data in said file holding means.

2. The printer control device of claim 1, further comprising:
    means for automatically effecting the transfer of said updated file from said file holding means to said file server at a predetermined instant in time.

3. The printer control device of claim 1, further comprising:
    means for automatically effecting the transfer of said updated file from said file holding means to said file server on a periodic basis.

4. The printer control device of claim 1, further comprising:
    means for effecting the transfer of said updated file from said file holding means to said file server upon a user's request.

5. A printer control device for a communication network including a plurality of mail transmission destinations, wherein important data stored in said printer control device can be restored, the printer control device comprising:
    means for receiving an updated file of important data to be printed by a printer which is controlled by the printer control device;
    file holding means for holding said updated file of important data;
    mail transmission destination setting means for specifying one of said plurality of mail transmission destinations to which said updated file of important data in said file holding means is to be transmitted prior to printing; and
    mail transmission control means for establishing a filing protocol with the mail transmission destination specified by said mail transmission destination setting means to transfer said updated file of important data from said file holding means to said mail transmission destination, and when requested, to read said updated file of important data from said mail transmission destination and restore said updated file of important data in said file holding means.

6. The printer control device of claim 5, wherein said mail transmission destination is a predetermined authorized person.

7. The printer control device of claim 5, wherein said mail transmission destination is a mail server.

8. The printer control device of claim 5, further comprising:
    means for automatically effecting the transfer of said updated file from said file holding means to said mail transmission destination at a predetermined instant in time.

9. The printer control device of claim 5, further comprising:
    means for automatically effecting the transfer of said updated file from said file holding means to said mail transmission destination on a periodic basis.

10. The printer control device of claim 5, further comprising:
    means for effecting the transfer of said updated file from said file holding means to said mail transmission destination upon a user's request.

11. A printer control device for a communication network including a plurality of external memory units, wherein important data stored in said printer control device can be restored, the printer control device comprising:
    means for receiving an updated file of important data to be printed by a printer which is controlled by the printer control device;
    file holding means for holding said updated file of important data;
    destination setting means for specifying one of said plurality of said external memory units to which said updated file of important data in said file holding means is transferred prior to printing; and
    file read and write control means for transferring said updated file of important data from said file holding means to the external memory unit specified by the destination setting means, and when requested, to read said updated file of important data from said external memory unit and restore said updated file of important data in said file holding means.

12. The printer control device of claim 11, wherein said external memory unit is a floppy disk drive.

13. The printer control device of claim 11, further comprising:
    means for automatically effecting the transfer of said updated file from said file holding means to said external memory unit at a predetermined instant in time.

14. The printer control device of claim 11, further comprising:
    means for automatically effecting the transfer of said updated file from said file holding means to said external memory unit on a periodic basis.

15. The printer control device of claim 11, further comprising:
    means for effecting the transfer of said updated file from said file holding means to said external memory unit upon a user's request.

* * * * *

UNITED STATES PATENT AND TRADEMARK OFFICE
CERTIFICATE OF CORRECTION

PATENT NO. : 5,131,077
DATED : July 14, 1992
INVENTOR(S) : Shigeo Indei

It is certified that error appears in the above-identified patent and that said Letters Patent is hereby corrected as shown below:

Column 7, line 25, claim 1, change "mans" to --means--.

Signed and Sealed this

Fifth Day of October, 1993

Attest:

BRUCE LEHMAN

Attesting Officer     Commissioner of Patents and Trademarks